(12) United States Patent
Freienstein et al.

(10) Patent No.: US 9,254,806 B2
(45) Date of Patent: Feb. 9, 2016

(54) DEVICE FOR CONTROLLING ALL AIRBAGS FOR A VEHICLE, A CONTROL UNIT FOR FORMING A CONTROL SIGNAL FOR ALL AIRBAGS FOR A VEHICLE, AND A SYSTEM OF THE DEVICE AND THE CONTROL UNIT

(75) Inventors: Heiko Freienstein, Weil der Stadt (DE); Robert Kornhaas, Spraitbach (DE)

(73) Assignee: ROBERT BOSCH GMBH, Stuttgart (DE)

( * ) Notice: Subject to any disclaimer, the term of this patent is extended or adjusted under 35 U.S.C. 154(b) by 1135 days.

(21) Appl. No.: 12/737,138

(22) PCT Filed: May 4, 2009

(86) PCT No.: PCT/EP2009/055363
§ 371 (c)(1),
(2), (4) Date: Mar. 2, 2011

(87) PCT Pub. No.: WO2010/000525
PCT Pub. Date: Jan. 7, 2010

(65) Prior Publication Data
US 2011/0140514 A1    Jun. 16, 2011

(30) Foreign Application Priority Data
Jul. 3, 2008  (DE) .......................... 10 2008 040 145

(51) Int. Cl.
*B60R 21/017* (2006.01)
*B60R 21/0132* (2006.01)
*B60R 21/0136* (2006.01)
*B60R 21/01* (2006.01)

(52) U.S. Cl.
CPC ........... *B60R 21/017* (2013.01); *B60R 21/0132* (2013.01); *B60R 21/0136* (2013.01); *B60R 2021/01061* (2013.01); *B60R 2021/01327* (2013.01)

(58) Field of Classification Search
USPC ....................................... 307/10.1
See application file for complete search history.

(56) References Cited

U.S. PATENT DOCUMENTS

2007/0046004 A1    3/2007  Komaki et al.
2008/0119991 A1    5/2008  Hattori

FOREIGN PATENT DOCUMENTS

DE    10 2004 015 125    10/2005

*Primary Examiner* — Rexford Barnie
*Assistant Examiner* — Dru Parries
(74) *Attorney, Agent, or Firm* — Kenyon & Kenyon LLP (57) ABSTRACT

A device for controlling all airbags for a vehicle is provided, and also a control unit for forming a control signal for all airbags for a vehicle, as well as a system of this device and this control unit. The device has a trigger circuit control and also an energy reserve, in order to control power switches in a trigger circuit as a function of the control signal that comes from the control unit, and to use the energy from the energy reserve to trigger the trigger elements for the airbags. The control unit receives at least parts of the energy supply from the device.

15 Claims, 6 Drawing Sheets

DEVICE FOR CONTROLLING ALL AIRBAGS FOR A VEHICLE, A CONTROL UNIT FOR FORMING A CONTROL SIGNAL FOR ALL AIRBAGS FOR A VEHICLE, AND A SYSTEM OF THE DEVICE AND THE CONTROL UNIT

BACKGROUND OF THE INVENTION

1. Field of the Invention

The present invention relates to a device for controlling all airbags for a vehicle, a control unit for forming a control signal for all airbags for a vehicle, and a system having the device and the control unit.

2. Description of Related Art

Published German patent application document DE 10 2004 015 125 A1 describes providing a trigger circuit control separated from a control unit having the evaluation circuit, which is designed as a microcontroller. The sensor system for detecting accident signals is also disposed outside of the control unit.

SUMMARY OF THE INVENTION

In contrast, the device according to the present invention for controlling all airbags for a vehicle and the control unit for forming a control signal for all airbags for a vehicle and a corresponding system having the device and the control unit have the advantage that now, using the device according to the present invention, which is the trigger unit for all airbags, the airbag system's space requirement is reduced on the central tunnel, on which the control unit is disposed. This also results in a reduction of the plug pin and thus of the cable harness on the central tunnel. The device and possibly also other components may be disposed somewhere other than on the central tunnel. By eliminating the airbag system on the central tunnel, it is possible to dispose additional driving dynamics sensors relating to the acceleration and the roll rate or other parameters in the central tunnel region. The microcontroller could also be enlarged in order to provide the installation of additional functions in the field of passive and/or active safety. It is also possible to use a plurality of devices according to the present invention to cover a concept that is scalable through the options of large systems having many control circuits.

The system according to the present invention is made up of two modules, that is, the device and the control unit.

The control unit normally has an evaluation circuit, for example, a microcontroller, and interfaces to the device. Interfaces to accident sensors, and also driving dynamics sensors, may also be provided. However, it is also possible for the control unit itself to have the sensors. This includes, for example, acceleration sensors for high accelerations in the vehicle longitudinal direction and the vehicle transverse direction, as well as sensors for driving dynamics functions, for example, acceleration sensors for low accelerations in the vehicle transverse direction and also roll rate sensors around the vertical axis, that is, yaw rate sensors.

Additional acceleration sensors and roll rate sensors may be integrated depending on the system requirement. A large development stage is to provide, for example, acceleration sensors for high accelerations in the vehicle longitudinal direction and the vehicle transverse direction, acceleration sensors in all three axes for low acceleration, and rotation rate sensors for all three axes, along with redundant sensors for the acceleration in the vehicle transverse direction and a yaw rate sensor, as well as structure-borne noise sensors.

The control unit according to the present invention may be positioned at a fixed location in the vicinity of the vehicle center of gravity for reasons of signal quality and the small latency times required for the airbag function.

The device according to the present invention as a control unit for at least the airbags, and possibly the belt tighteners as well as additional passenger protection means, has the trigger circuit control having power switches for controlling the airbag trigger elements, the energy reserve for the autarchy mode, and interfaces for the communication with the control unit. This device is also unattached and may thus be positioned anywhere in the vehicle.

The communication between the control unit and the device takes place, for example, via a so-called triggering bus according to ISO standard 22896, which provides a safe and reliable message transmission on the basis of its structure. However, other connections are also possible, like point-to-point connections or other bus types. In addition to an electric, wire-bound transmission, an optical or a radio transmission is also possible.

In the case at hand, the device according to the present invention is an airbag pre-unit that controls all airbags located in the vehicle. In this context, controlling the airbags means activating them, that is, bringing about an inflation. This typically occurs pyrotechnically via the triggering of a triggering element, consequently an explosive charge, that brings about the inflation of the airbag in the manner known to one skilled in the art.

The device has a single housing, which is made up of metal and/or plastic. In this context, the housing does not necessarily have to be made up of rigid elements. These could also be designed as at least partially flexible.

The energy reserve is normally made up of one or a plurality of capacitors, preferably electrolytic capacitors. However, other capacitor types are also a possibility. Other energy storage mechanisms may also be used in the case at hand. The energy reserve provides the energy for an autarchy case, i.e., in the event of a battery separation, the energy reserve is measured in such a manner that it still allows for the control of passenger protection means such as airbags or belt tighteners.

The trigger circuit control is normally made up of one or a plurality of ASICs, the ASICs having at least two power switches per trigger circuit and also a logic in order to be able to process the control signal and other signals, in order to also control these power switches accordingly only in the event of a control case. The power switches are normally power transistors, MOSFETs, for example.

The interfaces are normally hardware components that have a separate integrated circuit or are part of such an integrated circuit or are constructed in a discrete manner. Mixed forms are also possible. It is also possible that such an interface may be designed as a software element. In the case at hand, the interface provides the control signal and a supply module is provided between the energy reserve and the trigger circuit control, and it provides at least one necessary supply voltage for an operation and a trigger energy for the control for the trigger circuit control and the first interface. The trigger circuit control has a logic section for processing signals from the control unit, and the supply module obtains the necessary supply voltages for the elements of the device from the energy reserve or from a battery. The trigger circuit control may be made up of one or a plurality of ICs, it also being possible for the trigger circuit control to be part of a larger ASIC. The trigger circuit control may be integrated with the supply module on a large integrated circuit, for example. However, the supply module may also be provided separately, as an integrated circuit. A discrete solution is also possible in this context. For example, the supply module is also connected to the car battery and converts this voltage into a higher voltage, for example, 30 to 40V, for the energy reserve, and then once more takes the necessary energy from the energy reserve through a step-down transformation for the supply voltage and the trigger voltage. In this context, it is possible for the supply module to continuously take the energy from the energy reserve, even for the continuous operation without the autarchy. Alternatively, it is possible that even from the battery, the supply of the device occurs at least in part via the supply module. In this context, the battery voltage is in turn converted downward into the supply voltages. In the case at hand, a triggering from the battery voltage is also possible via the supply module.

The control unit according to the present invention is provided for the evaluation of accident sensor signals and forms a control signal for all airbags for the vehicle as a function thereof. In this context, the control unit is provided with an accident sensor system, for example, acceleration sensors in different spatial directions or also rotation rate sensors or rotational acceleration sensors. As described above, the acceleration sensors may be configured for large accelerations, but also for small accelerations. In this context, the accident sensor signal may be transmitted in a digital manner or in an analog manner, namely to the evaluation circuit, which may also have analog inputs. The evaluation circuit may be developed, for instance, as a microcontroller. However, it is possible to construct the evaluation circuit as another processor, an ASIC, or in a discrete manner. The evaluation circuit uses an evaluation algorithm on the at least one accident sensor signal. It may be implemented by software or hardware. Normally a classification or at least one threshold value comparison is performed in order to determine whether the trigger case exists or not. The control unit also has interfaces for outputting the control signal to the device and for providing at least one supply voltage for the control unit. That is, the control signal is transmitted, for example, via a bus, to the device, which then controls the airbags as a function thereof. In this context, the control signal indicates which airbags are to be controlled and at what force. The force is controlled via corresponding stages of airbag expansion, for example. The control unit receives the supply voltage from the device as well, namely via the supply module. However, the supply may also be drawn directly from the battery in front of another module.

The supply module has switching converters, at least for the step-down transformation. Corresponding direct voltage converters are provided for the step-up transformation.

The system according to the present invention, which is made up of the device and the control unit, has a bus connection or a point-to-point connection between the two devices, for example. This connection may be designed to be electric or optical, or on a radio basis.

The measures and the refinements set forth in the dependent claims make possible advantageous improvements of the device specified in the independent claims, and the control unit and system specified in the independent claims.

It is particularly advantageous that the supply module outputs the at least one supply voltage for a control unit outside of the control unit via an additional interface. This relates to the design in which the supply module in the device provides the supply for the entire system. Different voltage levels such as 5V and 3.3V may be provided.

It is furthermore advantageous that an additional interface is provided in the device, via which an activation signal is provided for the supply module. That is, the supply module is made active only if this activation signal exists. Thus, for example, an additional switch may implemented via the activation of the supply module. In particular, the activation may also only apply to the case in which the provision of the triggering energy occurs via the supply module.

It is furthermore advantageous that the device provides an additional interface that provides a plausibilization signal for the trigger circuit control, the trigger circuit control controlling the power switches as a function of the control signal and this plausibilization signal. This ensures that different trigger paths exist for the control of passenger protection means. Thus, a fundamental safety concept of the airbag electronics is fulfilled. The plausibilization signal must confirm the control signal in terms of its content. This plausibilization signal may have a first partial signal for releasing a first power switch of a respective trigger circuit and a second partial signal for releasing a second power switch of the respective control circuit. The division into partial signals further increases the safety. These partial signals may be transmitted sequentially or in parallel.

It is furthermore advantageous that the evaluation circuit is configured to output the activation signal via an additional interface for the supply module. The evaluation circuit may thus output the activation signal and in this manner treat the supply module as an additional switch in the device.

It is furthermore advantageous that the control unit has an evaluation module for the redundant evaluation of the at least one accident sensor signal and a monitoring circuit for the evaluation circuit, the evaluation module generating a first partial signal of a plausibilization signal, and the monitoring circuit generating the second partial signal. In this context, the evaluation module involves a simpler evaluation of the accident sensor signal, for example, using a fixed threshold. This may also be designed in a more complex manner. In particular, this evaluation circuit may be designed as an ASIC or as part of an ASIC. The monitoring circuit, for example, a watch dog, monitors the functioning of the evaluation circuit via known watch dog functions, for example, in that the watch dog asks the evaluation circuit questions and checks the answers. It may also be provided that the evaluation circuit must periodically operate this watch dog, in order to avoid being reset by the watch dog.

The device is advantageously connected to the control unit via a bus connection, for example, in accordance with the ISO standard. This allows for a particularly secure transmission of the data that is particularly significant in the case of control signals.

Exemplary embodiments of the present invention are illustrated in the drawing and are explained in greater detail in the following description.

DETAILED DESCRIPTION OF THE INVENTION

Figure 1:
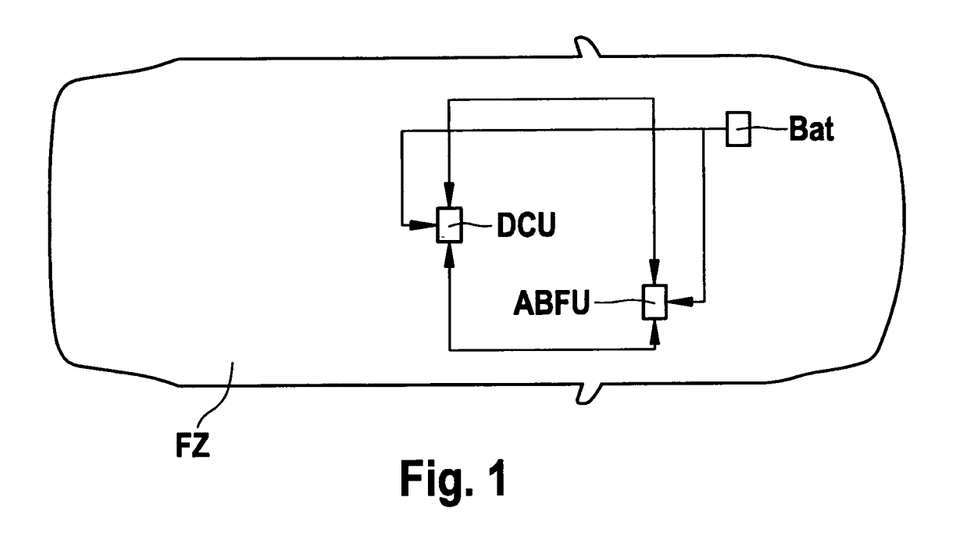
FIG. 1 shows the fundamental structure of the system.

FIG. 1 illustrates a vehicle FZ having a control unit DCU (=domain control unit) on the central tunnel of an airbag fire unit ABFU that is not located in the region of the central tunnel. Both components, control unit DCU and airbag fire unit ABFU as the device, are connected to the battery and also to each other. In the following, only the components necessary to gain an understanding of the present invention are shown. Additional components necessary for the operation of the control unit and the airbag fire unit are omitted for the sake of simplicity.

The basic function is that control unit DCU transmits the control signals and the plausibilization signal to airbag fire unit ABFU, so that the airbag fire unit is able to control the airbags in accordance with the control signal. Both control unit DCU and airbag fire unit ABFU respectively have their own housing and are not disposed together.

The energy supply comes from vehicle battery Bat, it being possible to directly connect the battery to control unit DCU and airbag fire unit ABFU. However, it is possible that the battery is only connected to airbag fire unit ABFU, and the airbag fire unit then supplies control unit DCU with the necessary supply voltages.

Figure 2:
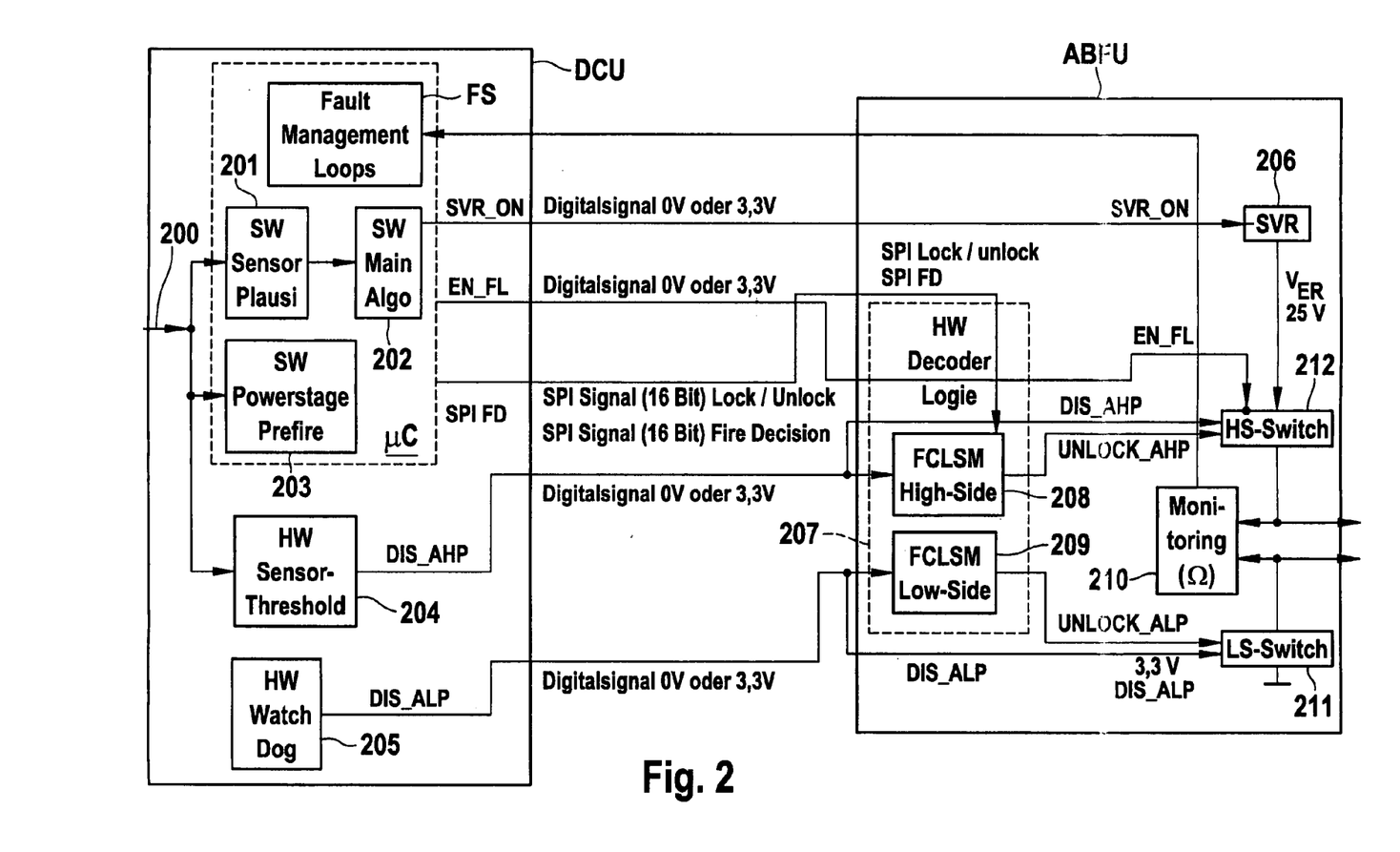
FIG. 2 shows a block diagram of the system according to the present invention.

FIG. 2 shows the system according to the present invention in a block diagram. In the case at hand, control unit DCU is connected to airbag fire unit ABFU via a plurality of lines. Control unit DCU provides the signals from acceleration sensors in the vehicle longitudinal direction and vehicle transverse direction via line 200. These sensor signals are usually preprocessed, e.g., a low-pass filtering or an integration from microcontroller µC, and evaluated in parallel by a safety controller 204. In the case at hand, the interfaces are either the sending and receiving modules themselves, such as the microcontroller and safety controller 204 or the trigger circuit control, or are omitted for the sake of simplicity.

In this context, as the evaluation circuit, microcontroller µC has a plurality of software modules. The sensor signals are read in in interface modules, are conditioned, and in the process are checked initially by a sensor module 201 for plausibility. In this module, it is ensured that a triggering never occurs on the basis of only one sensor alone. There is a configuration that codes the plausibilization logic. In the simplest case, a threshold comparison exists for two of the sensor channels, respectively. The logical output values are linked by logical AND. A triggering may occur only if both channels exceed the threshold.

Sensor signals 200 are also processed in block 203. A prefire signal is generated as a function of the signal level, for example, in an integral-based manner, and is combined with other signals generated in main evaluation algorithm 202 to form a flag EN_FL.

After the sensor plausibilization in block 201, main evaluation algorithm 202 is applied to the sensor signals. The control signal is then output as a function of its result. In this context, supply module 206 in airbag fire unit ABFU is then activated as a function of this evaluation, namely in relation to the triggering energy. A three-switch principle is implemented by this means.

Furthermore, microcontroller µC has an error memory FS, in which monitoring results of a monitoring unit 210 in airbag fire unit ABFU are stored. Monitoring unit 210 performs the monitoring in that it periodically checks the resistance of the triggering elements, for example, in that it applies a small voltage to the triggering element. Alternatively, it is also possible to superpose a small current and to measure the dropped voltage.

As specified above, an evaluation of sensor values 200 is performed in safety controller 204 in parallel to microcontroller µC. In this context, only one fixed threshold value is checked, for example. This evaluation result of safety controller 204 is then transmitted via a line to high-side step 212 and to evaluation logic 207. A transmission via a separate physical line was represented in this embodiment. In the case at hand, the transmitted levels may have 0 or 3.3V. The high-side output stage 212 is released by the release signal of safety controller 204 using a MOSFET transistor.

Low-side output stage 211 is released in a corresponding manner by watch dog 205. This signal is also transmitted in decoder 207 of the trigger circuit control.

Figure 5A:
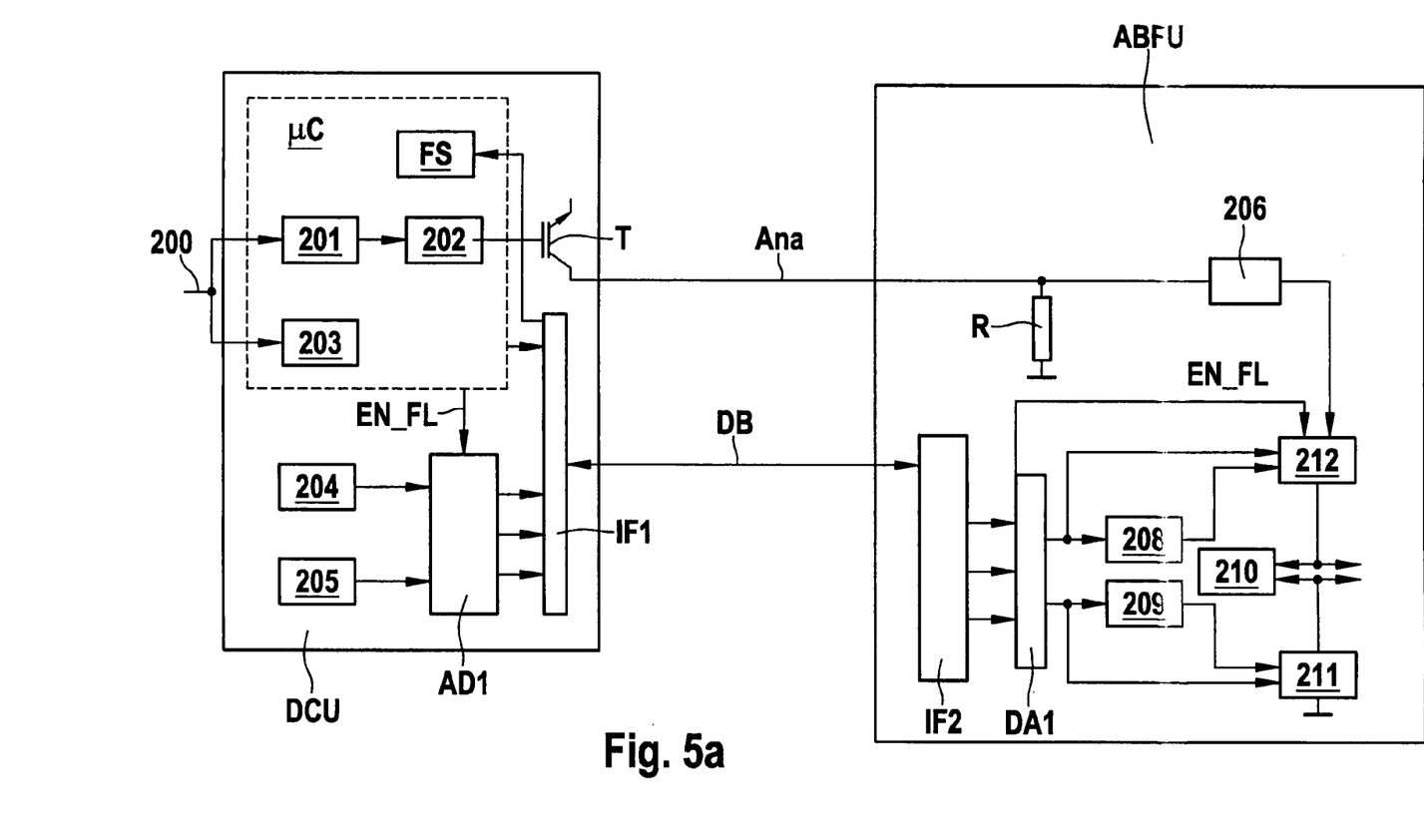
FIGS. 5a and b show additional exemplary embodiments of the system according to the present invention.
Figure 5B:
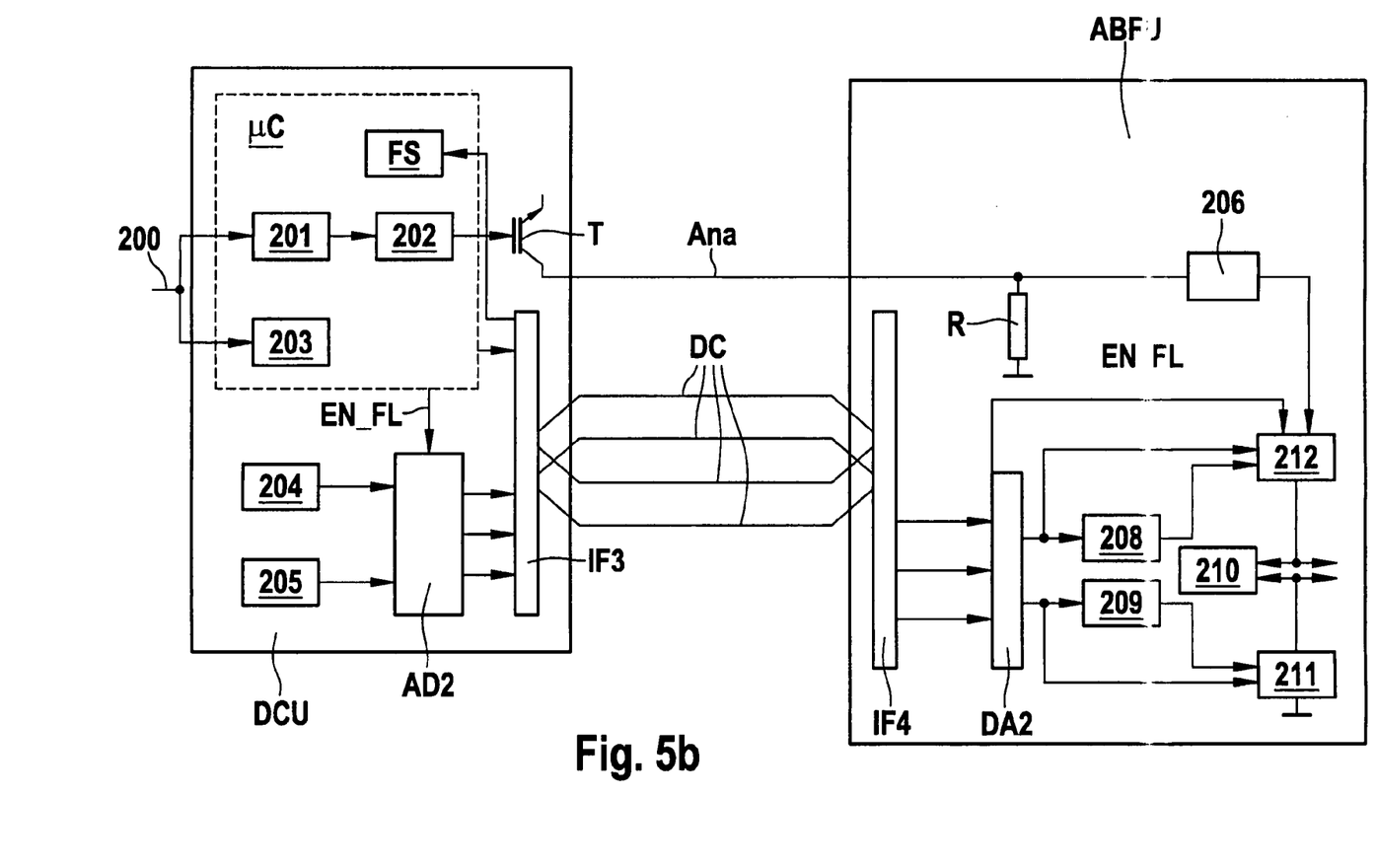

A secure protocol (for example, ISO22896 or TTCAN) is used for the transmission of the control signal. Generally, the signals from illustration 2 may be grouped together in a suitable manner for the purpose of optimizing the networking of the system. Two variants that advantageously group together the signals to be transmitted are illustrated in FIG. 5. FIG. 5a illustrates the grouping together into two physical lines, a digital line DB and an analog line Ana. Additionally, for analog line Ana, a transistor T is provided as a driver in the DCU and a reception resistance R is provided in airbag fire unit ABFU. FIG. 5b provides three lines, an analog Ana and a DC, that was designed in a duplicated manner using daisy chain technology. The same reference symbols as in FIG. 2 were used for the same elements, transistor T and resistance R also being illustrated in both FIGS. 5a and 5b. Interfaces IF1 and IF2 are provided for the digital transmission, and interfaces IF3 and IF4 are provided for the daisy chain configuration. The analog-digital converters AD1 and AD2 as well as the digital-analog converters DA1 and DA2 are accordingly numbered consecutively.

An unable signal and in parallel a fire signal are transmitted into evaluation logic 207. The fire signal is 16 bits long and indicates, for example, which airbags are to be controlled and at what force, if the airbags involved are multi-stage airbags. This is also applicable to pyrotechnical belt tighteners and electromotive actuator systems. In the case at hand, the enable (release) signal EN_FL goes via evaluation logic 207 likewise to high-side output stage 212. This signal also releases this output stage. The evaluation of the fire signal via the SPI bus and the releasing by safety controller 204 is logically rounded in block 208 and results in the controlling of high-side stage 212. Low-side output stage 211 is enabled on the basis of the watch dog signal alone via control module 209 for low-side output stage 211.

Figure 3:
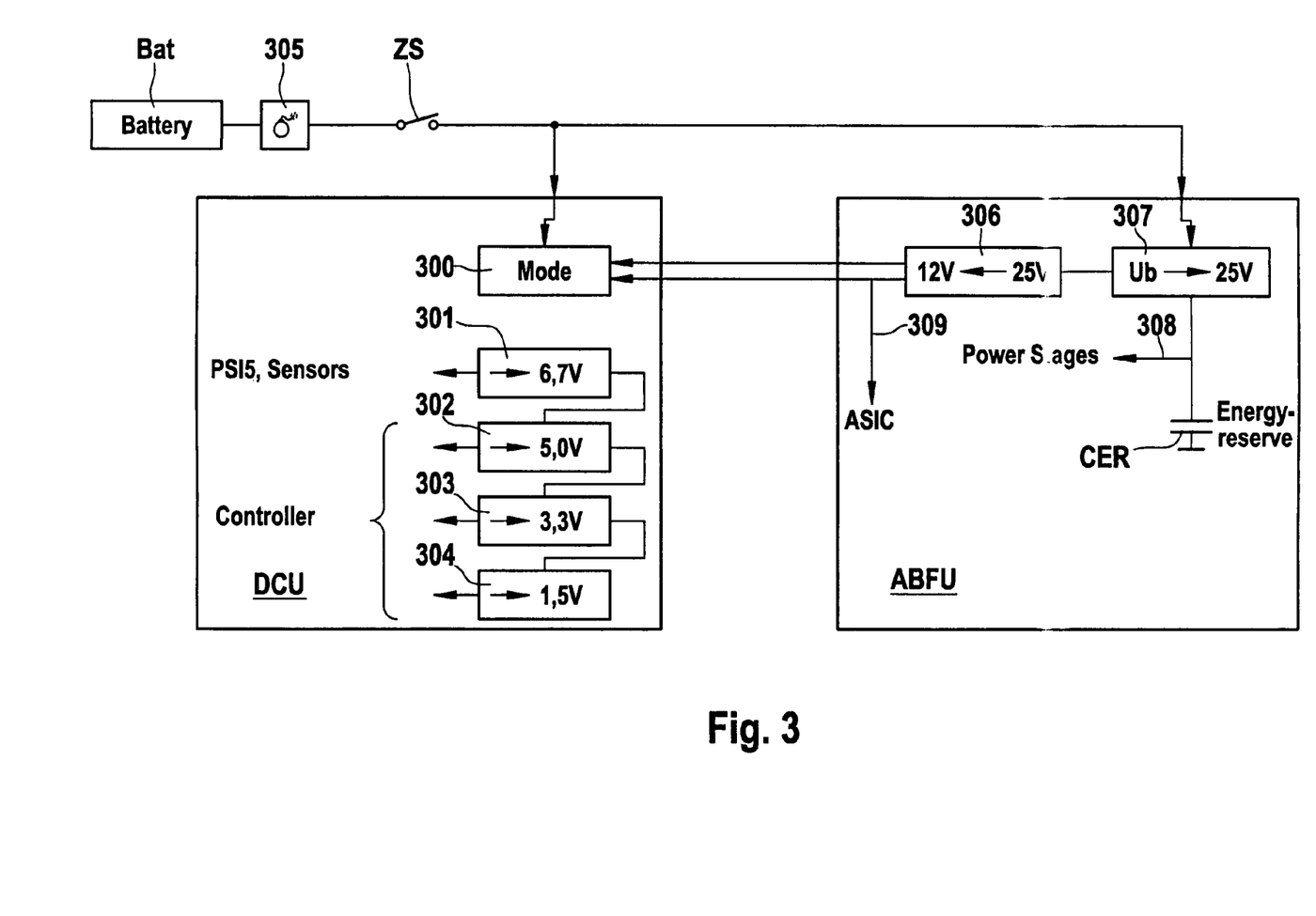
FIG. 3 shows another block diagram of the system according to the present invention.

FIG. 3 shows the system according to the present invention in an additional block diagram. In the case at hand, only the energy supply is described. The rest has been omitted for the sake of simplicity. Vehicle battery Bat is connected via block 305 and ignition switch ZS to control unit DCU and to airbag control unit ABFU. The battery may be separated using switch 305.

Thus, if the ignition switch is closed, then the vehicle battery is connected to control unit DCU and airbag fire unit ABFU. The battery voltage is applied to supply module 307 in airbag fire unit ABFU, block 307 bringing about the step-up transformation of the battery voltage to 25V and storing it in the energy reserve. The power output stages in the control circuits may then be supplied with the triggering energy from capacitor CER via connection 308. The voltage transformed upward in block 307 is again transformed downward to 12V in block 306, which likewise belongs to the supply module. These 12V are then supplied to the trigger circuit control and other components in airbag fire unit ABFU.

These 12V are then transmitted via an energy supply line in control unit DCU, in order to supply control unit DCU with energy at least in the autarchy case. Battery Bat is also connected to the control unit via ignition switch ZS into block 305, namely at block 300. The voltage supply of the DCU is connected in block 300, i.e., in the autarchy case switched from the battery to airbag fire unit ABFU.

Block 300 is followed by block 301, which transforms the 12V downwards into 6.7V, and provides these 6.7V to external sensors and also internal sensors. The downward transformation to 5V takes place in block 302, to 3.3V in block 303, to 1.5V in block 304. These voltages are preferably supplied to the evaluation circuit, in the microcontroller.

Figure 4:
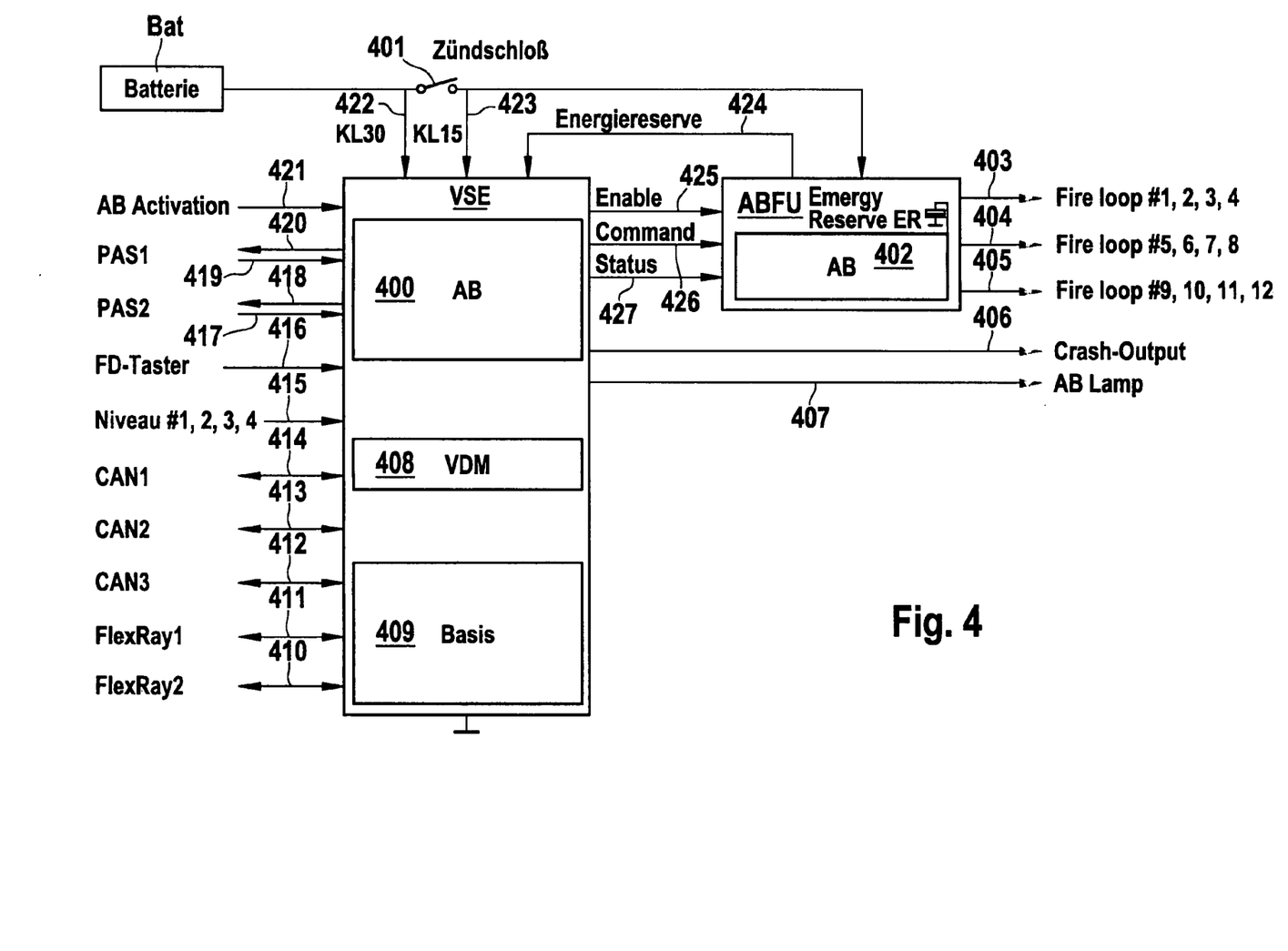
FIG. 4 shows a third block diagram of the system according to the present invention.

FIG. 4 illustrates an additional block diagram of the system according to the present invention, modules from driving dynamics functions and airbag functions being equally integrated in the DCU:

Elements 400, 408, and 409 represent the functions implemented in the DCU. Block 400 is the functionality related to the airbag, block 408 comprises the functions related to the driving dynamics (vehicle dynamic module=VDM). Lines 415 and 416 represent input signals (switches) for the VDM. Block 409 stands for basic functionalities associated with general basis software of the DCU, e.g., communication or sensor data conditioning. 410 and 411 are Flexray communication lines; lines 412 to 414 are for the CAN communication.

Battery Bat is connected via ignition switch 401 to the central unit in control unit DCU, namely via line 423 and/or 422. In the illustrated example, parts of the DCU are supplied via 422, and other parts of the DCU and the ABFU via line 423, that is, when the ignition is switched on.

The battery is furthermore connected to airbag fire unit ABFU, which is designed as in FIGS. 3 to 4. Airbag fire unit ABFU has energy reserve ER as well as the trigger circuit control having interfaces 402. The airbag fire unit controls the control circuits via outputs 403, 404, and 405, and obtains the release signal via line 425 and the fire command via line 426. Airbag fire unit ABFU transmits via line 427 the status that its monitoring circuit displays to the triggering elements. In the autarchy case, central unit DCU is supplied with energy via line 424. Central unit DCU outputs, for example, the crash-output signals via line 406 and a control for a warning lamp 407 in order to display a malfunction of the airbag system. The output crash output provides the triggering decision of the airbag to other systems.

PAS signals go via lines 417 and 419 into the central unit, the energy supply via line 420 and 418 being represented separately. The activation/deactivation of the passenger airbag is transmitted via line 421 as a function of the occupation situation or of a switch.

What is claimed is:

1. A device for controlling airbags of a vehicle, the device having a single housing, comprising:
at least one energy reserve that receives electric energy from a battery and provides electric energy for an autarchy case,
a trigger circuit control that has a plurality of power switches, the trigger circuit control controlling the power switches as a function of a control signal to trigger the airbags,
a first interface that provides the control signal, and
a supply module, connected between the energy reserve and the trigger circuit control, which provides a boosted battery voltage to charge the energy reserve and a triggering energy for the trigger circuit control to trigger the airbags.

2. The device as recited in claim 1, wherein the supply module outputs, via a second interface, the at least one supply voltage for a control unit outside of the housing.

3. The device as recited in claim 1, wherein a third interface is provided, via which an activation signal for the supply module is provided.

4. The device as recited in claim 2, wherein a third interface is provided, via which an activation signal for the supply module is provided.

5. The device as recited in claim 1, wherein the device provides a fourth interface that provides a plausibilization signal for the trigger circuit control, the trigger circuit control controlling the power switches as a function of the control signal and the plausibilization signal.

6. The device as recited in claim 2, wherein the device provides a fourth interface that provides a plausibilization signal for the trigger circuit control, the trigger circuit control controlling the power switches as a function of the control signal and the plausibilization signal.

7. The device as recited in claim 3, wherein the device provides a fourth interface that provides a plausibilization signal for the trigger circuit control, the trigger circuit control controlling the power switches as a function of the control signal and the plausibilization signal.

8. The device as recited in claim 5, wherein the fourth interface provides as the plausibilization signal a first partial signal for releasing a first power switch of a respective trigger circuit and a second partial signal for releasing a second power switch of the respective trigger circuit.

9. The device as recited in claim 6, wherein the fourth interface provides as the plausibilization signal a first partial signal for releasing a first power switch of a respective trigger circuit and a second partial signal for releasing a second power switch of the respective trigger circuit.

10. The device as recited in claim 7, wherein the fourth interface provides as the plausibilization signal a first partial signal for releasing a first power switch of a respective trigger circuit and a second partial signal for releasing a second power switch of the respective trigger circuit.

11. A control unit for forming a control signal for all airbags for a vehicle, comprising:
an accident sensor system for outputting at least one accident sensor signal,
an evaluation circuit for outputting a control signal as a function of the at least one accident sensor signal,
a fifth interface for outputting the control signal to the device in accordance with claim 1, and
a sixth interface for providing at least one supply voltage for the control unit, the sixth interface being configured in such a manner that the sixth interface receives the at least one supply voltage from outside of the control unit.

12. The control unit as recited in claim 11, wherein the evaluation circuit for outputting an activation signal via a seventh interface for a supply module in the device is configured in accordance with claim 1.

13. The control unit as recited in claim 11, wherein the control unit has an evaluation module for the redundant evaluation of the at least one accident sensor signal and a monitoring circuit for the evaluation circuit, the evaluation module generating a first partial signal of a plausibilization signal and the monitoring circuit generating a second partial signal for the plausibilization signal, an eighth interface for outputting the plausibilization signal being provided.

14. A system comprising the device as recited in claim 1, and the control unit as recited in claim 11.

15. The system as recited in claim 14, wherein the device and the control unit are connected to each other by a bus connection.

* * * * *